United States Patent [19]

Berndt

[11] Patent Number: 4,777,697
[45] Date of Patent: Oct. 18, 1988

[54] CASTER WHEEL MOUNT APPARATUS WITH SEPARATE LOAD CARRYING AND SWIVEL BALL BEARINGS

[76] Inventor: Lon G. Berndt, P.O. Box 502, Hustisford, Wis. 53034

[21] Appl. No.: 3,636

[22] Filed: Jan. 15, 1987

[51] Int. Cl.[4] ............................................. B60B 33/00
[52] U.S. Cl. ............................................. 16/21; 16/36
[58] Field of Search .................. 16/21, 22, 23, 26, 27, 16/36

[56] References Cited

U.S. PATENT DOCUMENTS

| | | | |
|---|---|---|---|
| 1,106,853 | 8/1914 | Smouse . | |
| 1,233,093 | 7/1917 | Malloy | 16/21 |
| 1,582,598 | 4/1926 | Hancock | 16/21 |
| 1,809,609 | 6/1931 | Turner | 16/21 |
| 1,838,678 | 12/1931 | Herold . | |
| 1,882,497 | 10/1932 | Jarvis | 16/21 |
| 2,478,035 | 8/1949 | Babcock | 16/21 |
| 2,617,668 | 11/1952 | Stewart | 286/5 |
| 2,787,804 | 4/1957 | Noelting et al. | 16/21 |
| 3,127,633 | 4/1964 | Schultz | 16/21 |
| 3,263,266 | 4/1966 | Rabelos | 16/44 |
| 3,547,459 | 12/1970 | Lapham | 280/79.2 |
| 4,620,342 | 11/1986 | Haussels | 16/18 R |

FOREIGN PATENT DOCUMENTS 542738 10/1929 Fed. Rep. of Germany .......... 16/21

Primary Examiner—Fred A. Silverberg
Attorney, Agent, or Firm—Robert T. Johnson

[57] ABSTRACT

Caster wheel mount apparatus is disclosed, which comprises load carrying bearings and swivel bearings, each set of bearings is contained in its own race, and the bearings are protected from contamination by a skirt on the outer periphery of the load carrying bearings, and drainage of the races of the bearings is has should contaminants such as water or steam enter the bearing mount races. A suitable grease fitting is mounted on the load bearing race for lubrication as needed.

6 Claims, 2 Drawing Sheets

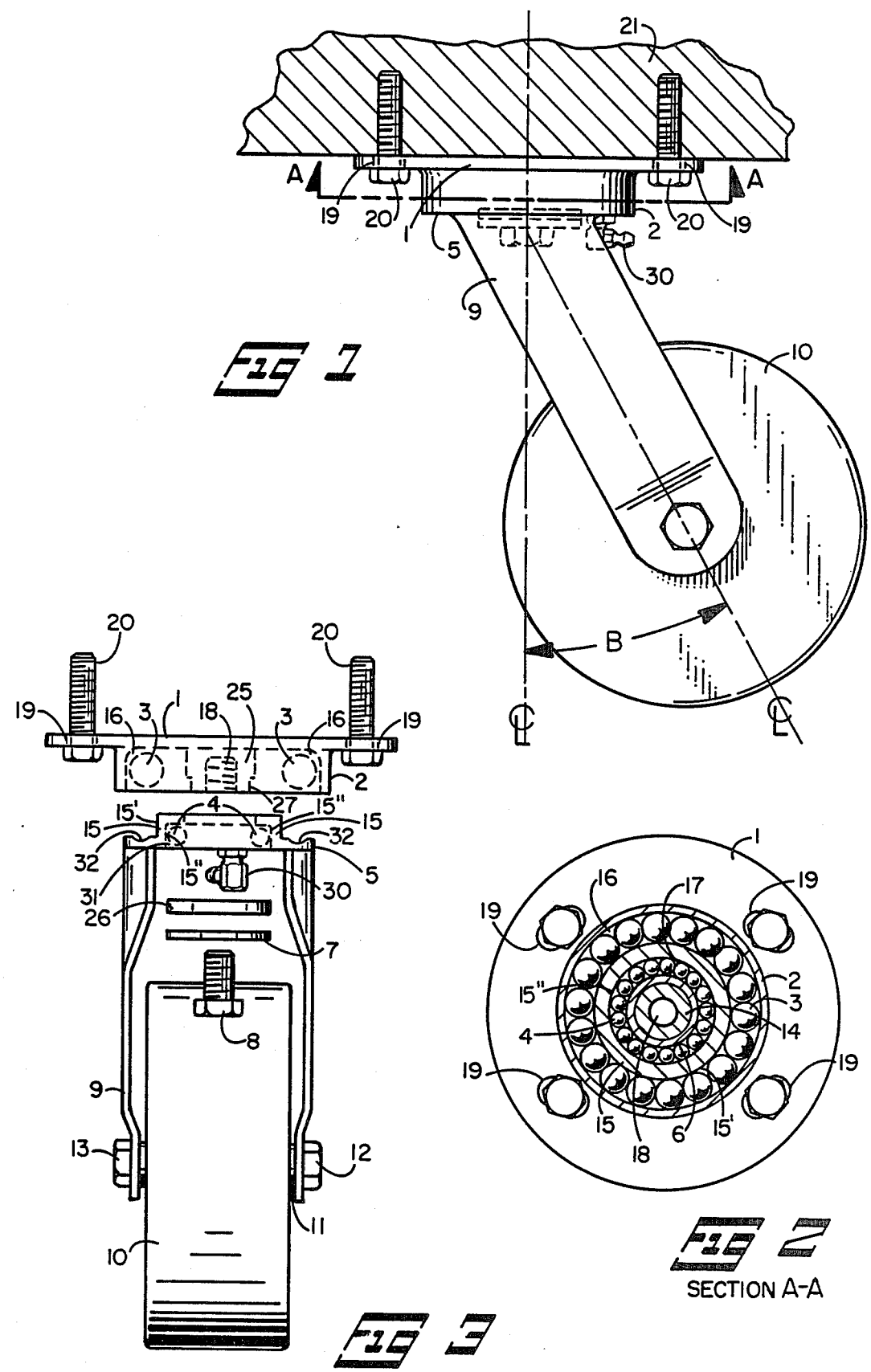

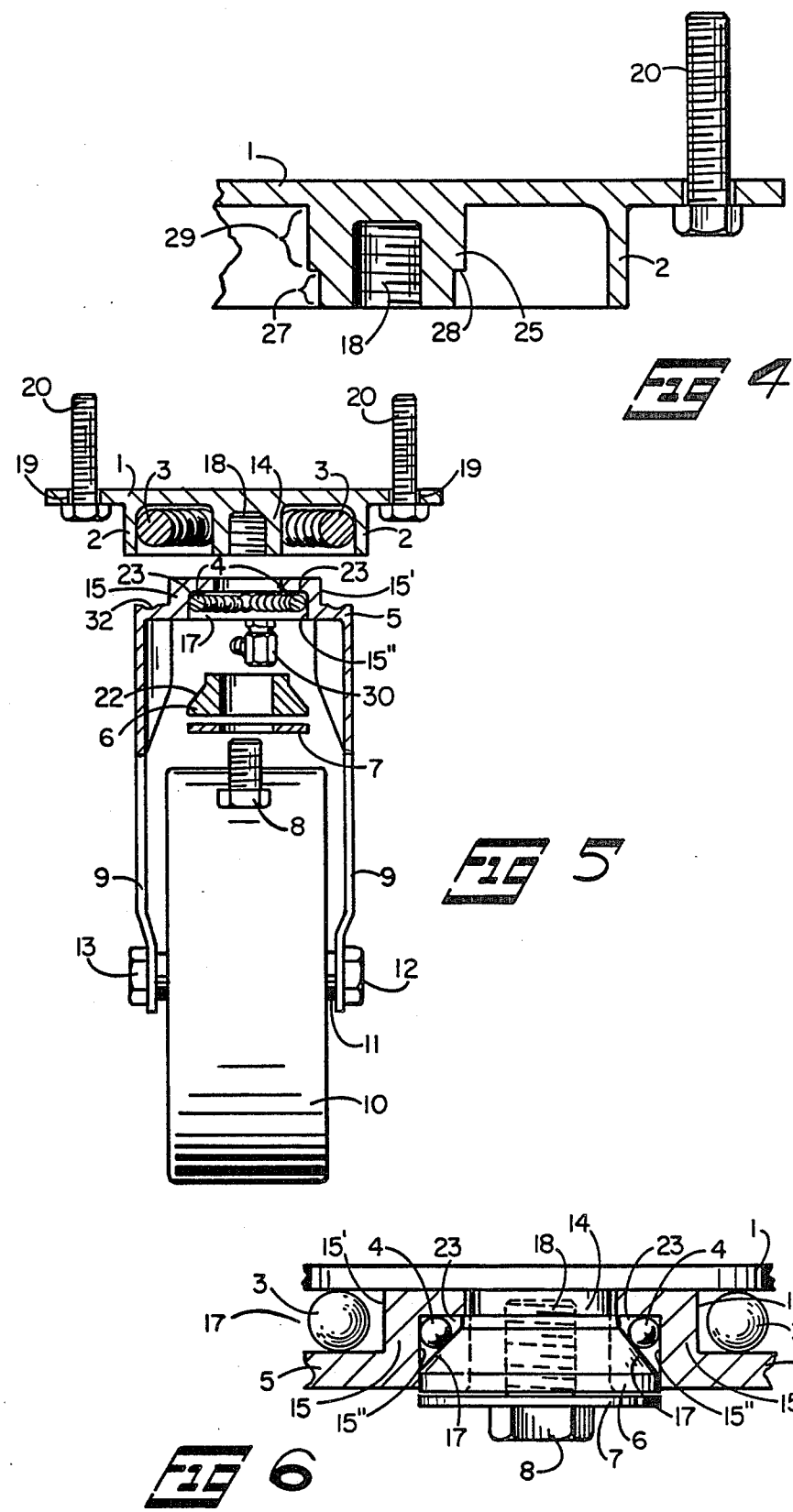

1 …

CASTER WHEEL MOUNT APPARATUS WITH SEPARATE LOAD CARRYING AND SWIVEL BALL BEARINGS

BACKGROUND

Caster wheels are mounted in several different ways, such as by inserting a stem from caster wheel mount into the bottom of a table leg for light loads. Another way, for heavy loads, is to attach caster wheel mount plate on the bottom side of cart platforms.

When the caster wheel mount plate is attached on the bottom or underside of a cart platform, the caster wheel hub and wheel holder legs are then free to swivel or pivot as required on moving the cart platform. When the caster wheel mount plate is attached to the cart bottom, the caster wheel hub and mount therefor is attached to the mount plate by means of a pin and ball bearings held in a periphery around the caster pin to allow for pivoting of caster wheel mount.

Up to now problems of corrosion or rusting of the ball bearings and the races in which the ball bearings are held, has been encountered in industrial environments such as water, steam, etc.

This invention discloses caster wheel apparatus having two groups of ball bearings, one group being load carrying ball bearings and the other group of ball bearings being swivel ball bearings. As will be disclosed, the swivel ball bearings do not carry any load but serve only to allow swiveling of the caster wheel mount.

This present invention is to disclose caster wheel apparatus wherein the bearings are protected from water splashage and the bearings are so mounted to provide load carrying bearings, and swivel bearings, and further the pivot or swivel bearings are so mounted to allow ease of swiveling of the caster wheel yoke or horn, and to reduce wear of the swivel mount.

EXPLANATION OF THIS DISCLOSURE

This invention of caster wheel mount frame apparatus is to disclose apparatus wherein ball bearings in races are protected from water and foreign matter by a unique arrangement of the ball bearings to provide load carrying bearings and swivel bearings in their respective bearing races.

There are two individual sets of ball bearings which are identified as (1) load carrying ball bearings, and (2) swivel or pivot ball bearings. Each set of ball bearings are contained in a separate bearing race of the caster wheel mount apparatus.

OBJECTS OF THIS INVENTION

It is an object of this invention to disclose caster wheel mount frame apparatus comprising a fastening plate and a load carrying ball bearing outer race way on the underside of the fastening plate and a center post centered on and extending downward from the fastening plate and a pivot plate and an inner raceway centered thereon and swivel ball bearings contained in this race way provided by the inner race way and a space centered in pivot plate is provided and ball bearings contained in the periphery of this space and threads are provided in the center of the center post and these threads extending lengthwise of the center post.

Another object of this invention is to disclose, as shown in FIGS. 5 and 6, caster wheel mount apparatus comprising a top mount plate and outer bearing retainer for load carrying ball bearings, attached to said mount plate, and a bearing face plate wherein the face plate fits within the outer bearing retainer and load carrying ball bearings are mounted in bearing race between the top mount plate and the bearing face plate and load carrying ball bearings are held in the bearing race by inner periphery of outer bearing retainer attached to the mount plate and the outer periphery of inner load carrying ball bearing retainer ring attached to the face plate and pivot or swivel ball bearings mounted between inner periphery of load carrying ball bearing retainer and a swivel bearing cone, and the swivel bearing cone mounted concentrically around the center post, and the center post is attached to center of top mount plate and legs for mounting of caster wheel are attached to outer surface of the face plate, and caster wheel mounted on an axle held between the legs. The legs are canted from the vertical center line of the center post such that the axle is outside of the center line of the center post.

Another object of this invention is to disclose caster wheel mount apparatus wherein swivel ball bearings ride in bearing races between the angle surface of a swivel bearing cone and the inner periphery of load carrying ball bearing retainer and the swivel bearing cone is held in mounted position concentric with center post by means of a retainer plate held in mounted position by a bolt threaded into center post of top mount plate.

Another object of this invention is to disclose, as shown in FIGS. 3 and 4, a top mount plate and outer load carrying ball bearing retainer and load carrying ball bearings in race for these bearings and swivel bearings in race for these bearings, this race bounded by bearing face plate riding on stepped center post and held in such position by bolt threaded into stepped center post and holding retainer plate against the swivel bearing retainer and wheel mount legs attached to bearing face plate and caster wheel axle mounted on the caster wheel mount legs and a caster wheel mounted on the caster wheel axle and the caster wheel mount legs canted such that the caster wheel axle is offset from the center line of stepped center post mounted on top mount plate.

Another object of this invention is to disclose caster wheel mount apparatus wherein the swivel ball bearings are mounted in a race bounded on one side by a swivel bearing cone mounted concentrically around a center post and as an alternate to this swivel bearing cone, the swivel ball bearings are bounded on one side by a stepped center post.

BACKGROUND ART PATENTS

U.S. Pat. No. 1,83,678 to Herold for Caster. This patent covers a ball bearing mount for caster wheels and includes load bearings and side thrust bearings, and sealing of the bearings.

U.S. Pat. No. 2,478,035 to Babcock for Compound Swivel Caster. This patent covers an eccentric mounted caster wheel swivel plate.

U.S. Pat. No. 2,617,668 to Stewart for Seal Construction. This patent is for a resilient sealing ring to form a leakproof joint and prevent escape of lubricant from ball race bearings.

U.S. Pat. No. 2,787,804 to Noelting for Caster Bearing Seal And Damper. This patent discloses a means to provide a ball retainer plate of the caster with a permanently affixed flexible seal.

U S. Pat. No. 3,127,633 to Schultz for Dual Race Caster. Disclosure in this patent is for a caster with dual ball bearing races.

U.S. Pat. No. 3,263,266 to Rabelos for Vertical Pressure Swivel Caster. This patent discloses bearing mounts for swivel caster in which the bearings and caster mount is attached to a spring loaded base and bearing centers are on a horizontal plane.

U.S. Pat. No. 4,620,342 to Haussels for Swivel Bearing for Casters. Disclosure in this patent is for a double set of bearings riding on a common flange. These bearing sets ride on a common flange, and as such does not touch this present disclosure.

Other patents of interest are: U.S. Pat. Nos. 1,106,853 3,547,459.

The above patents either singly or collectively do not anticipate or make obvious the disclosure or the claims of this present invention.

BRIEF DESCRIPTION OF FIGS. 1-6

FIG. 1—Elevation view of caster wheel frame apparatus showing:
1—Top mount plate
2—Outer load carrying bearing retainer
5—Bearing face plate
9—Caster wheel mount legs
10—Caster wheel
19—Top plate mounting slots
20—Top mount plate fasteners or screws
21—Box mounted on top mount plate of caster wheel frame apparatus
B—Angle of caut from center line of center post FIG. 2—Plan view as indicated in FIG. 1: section line A—A
1—Top mount plate
2—Outer load carrying bearing retainer
3—Load carrying ball bearings
4—Inner swivel bearings
6—Swivel bearing race bushing cone
14—Center post
15—Retainer ring wall for bearings
15—Retainer ring wall for bearings
15'—Inner retainer wall surface for outer load carrying bearings
15"—Outer retainer wall surface for swivel bearings
16—Raceway for load carrying ball bearings
17—Raceway for swivel ball bearings
19—Mounting slots
20—Top mount plate fasteners or screws FIG. 3—Elevation view of components of caster wheel mount apparatus and stepped center post wherein:
1—Top mount plate
2—Outer load carrying ball bearing retainer
3—Load carrying ball bearings
4—Swivel bearings
5—Bearing face plate
7—Retainer plate
8—Threaded bolt
9—Caster wheel mount legs
10—Caster wheel
11—Caster wheel axle
12—Caster wheel axle retainer nut
13—Caster wheel axle bolt head
15—Retainer ring wall for bearings
15'—Inner retainer wall surface for outer load carrying ball bearings 15"13 Outer retainer wall surface for swivel bearings
16—Race for load carrying ball bearings
18—Female thread in center post
19—Mounting slots
20—Top mount plate fasteners or screws
25—Stepped center post
26—Swivel bearing retainer
27—Small diameter segment of stepped center post
30—Grease fitting
31—Swivel bearing race
32—Track for load bearings FIG. 4—Elevaton view of stepped center post.
1—Top mount plate
18—Female thread in center post
20—Top mount plate fastener or screws
25—Stepped center post
27—Small diameter segment of stepped center post
28—Step from small to larger diameter segments of stepped center post
29—Larger diameter segment of stepped center post FIG. 5—This is elevation cross section view of caster mount apparatus, including swivel bearing race cone
1—Bearing mount plate
2—Outer load carrying bearing retainer
3—Outer load carrying bearings
4—Inner swivel bearings
5—Outer bearing face plate
6—Swivel bearing cone
7—Retainer plate
8—Threaded bolt
9—Caster wheel mount legs
10—Caster wheel
11—Caster wheel axle
12—Caster wheel axle retainer nut
13—Caster wheel axle bolt head
14—Center post
15—Retainer ring wall for bearings
15'—Inner retainer wall surface for outer load carrying bearings
15"—Outer retainer wall surface for inner swivel bearings
16—Raceway for outer load carrying bearings
17—Raceway for swivel ball bearings
18—Threads in center post 14
22—Taper section of swivel bearing race cone
23—Swivel bearing retainer of bearing face plate
30—Grease fitting FIG. 6—Enlarged elevation view of swivel bearings and swivel bearing race cone and mount wherein:
1—Top mount plate
4—Inner swivel bearings
5—Bearing face plate
6—Bearing race bushing cone
7—Retainer plate
8—Threaded bolt
14—Center post
15—Retainer wall for bearings
15'—Inner retainer wall surface for outer load carrying bearings
15"—Outer retainer wall surface for swivel bearings
13 17—Raceway for swivel ball bearings
14 18—Threads in center post 14
23—Swivel bearing retainer of bearing face plate

DETAILED DESCRIPTION OF INVENTION

This invention is to disclose caster wheel mount apparatus protected from water splashage and to withstand heavy loads and to readily swivel or pivot to facilitate change of direction of movement of cart mounted on casters.

The invention can best be described as comprising two sets of bearings, one set of bearings being outer load carrying bearings 3, and the other being inner swivel or pivot bearings 4.

This caster wheel apparatus with the two sets of ball bearings is of such construction that only the load carrying ball bearings 3 support the load while the swivel ball bearings 4 do not carry any of the load but function merely to provide ease of swiveling of the caster wheel mount legs 9.

Referring now to FIGS. 1, 2, 3 and 4, ball inner swivel bearings 4 in this caster wheel apparatus are in a race between a stepped center post 25, and the outer retainer wall surface for inner swivel bearings 15". As an alternate, see FIGS. 5 and 6, the swivel ball bearings 4 in this caster wheel apparatus are in a race between a taper section 23 of swivel bearing race bushing cone 6 and the outer retainer wall surface for inner swivel bearings 15".

Grease fitting 30 is affixed to bearing face plate 5 as shown in FIGS. 3 and 5.

Track for load bearings 32, as shown in FIGS. 3 and 5, is an arc having the same radius as the load carrying ball bearings. This arc is very shallow being only about 0.0625" deep or less.

Swivel bearing retainer 26 fits concentrically on small diameter segment of stepped center post 26, and thus swivel bearing retainer rides on step from small to larger diameter segments of stepped center post 28, the larger diameter section 29 of stepped center post 25, serves as swivel bearing race retainer wall for swivel bearings 4.

As an alternate and as shown in FIGS. 1, 2, 5 and 6, the caster wheel mount apparatus can be described as follows.

Outer load carrying bearings 3 are mounted in outer race 16. Inner swivel, or pivot bearings 4, are mounted in inner pivot bearing raceway 17 and are in contact with bearing race bushing cone 6,aand outer retainer wall surface 15". Inner swivel bearings 4 are in contact with the cone or tapered segment of bearing race bushing cone 6, and bearings 4 also are in contact at their outer periphery with inner race way retainer surface 15".

The outer load carrying bearings 3 are contained in outer race way 16 which is defined by outer bearing retainer 2 and outer load carrying bearing inner retainer wall surface 15'. The outer bearing retainer 2 is attached to top mount plate 1. In addition, the outer race way 16 is bounded by outer bearing face plate 5, and bearing mount plate 1.

Inner swivel or pivot bearings 4, are held in race way 17 by bearing race bushing cone 6, and bounded by outer retainer 15" for inner swivel bearings 4 and bearing mount plate 1.

Caster wheel 10 is mounted on hex headed caster wheel axle 11 held in place by caster wheel axle retainer nut 12.

Caster wheel mount legs 9, otherwise described as a yoke or horn, are attached to outer bearing face plate 5, and caster wheel 10 is mounted on caster wheel axle 11, held in mount legs 9. The axle 11 is held in position by wheel axle retainer nut 12, and caster wheel axle bolt head 13.

Outer bearing face plate 5, to which is attached the caster wheel mount legs 9, as indicated above, is mounted to ride on outer load carrying bearings 3, and to be held in contact therewith by means of threaded bolt 8 threaded into threads 18 in center post 14.

Top mount plate 1 may be square or round or of similar shape to mount on bottom of box 21.

Bearing race bushing cone 6 is mounted concentric to center post 14, and the tapered or conical segment 22 of bearing race cone 6 is in contact with inner pivot, or swivel, ball bearings 4 and the raceway of these swivel bearings 4 is further bounded by 15' as the outer retainer surface, and surface 23 of bearing face plate 5, and bearing mount plate 1.

The caster wheel apparatus is attached to the cart 21 bottom by means of screws 20 or other fasteners inserted through mounting slots 19 of top mount plate 1.

This invention can be further described as caster wheel mount apparatus comprising a top mount plate 1, and an outer bearing retainer 2 for load carrying bearings 3 attached to mount plate 1, and a bearing face plate 5, fitting within outer load carrying bearing retainer 2 and load carrying ball bearings 3, mounted in bearing raceway 6, between the top mount plate 1 and bearing face plate 5, and the load carrying ball bearings 3 are held in bearing raceway 16 by inner periphery of outer bearing retainer 2, attached to mount plate 1, and the outer periphery 15' of inner load carrying ball bearing retainer ring 16 attached to bearing face plate 5 and swivel ball bearings 4 mounted between inner periphery surface 15" of load carrying ball bearing retainer 15 and swivel or pivot bearing cone 6, and the pivot bearing cone 6 mounted concentrically around center post 14 and the center post 14 attached to center of top mount plate 1, and the swivel bearing cone 6, and bearing face plate 5 held in mounted position by means of retainer plate 7 mounted on center post 14, and this retainer plate to extend over the top surface of swivel bearing cone 6, and the retainer plate held in position by means of threaded bolt 8, threaded into threads in center post 18 in the center post 14 and caster wheel mount legs 9, for mounting of caster wheel 10, attached to outer surface of the face plate 5 and a caster wheel 10 mounted on caster wheel axle 11 held between legs 9.

As noted in FIG. 1 elevation view, the caster wheel mount legs 9 are canted at an angle "B" such that the axle 11, is offset from the center line of center post 14 mounted on top plate 1.

It is to be pointed out that legends 15' and 15" are the surfaces of retainer ring wall 15 for load carrying ball bearings and swivel ball bearings.

Referring to FIGS. 5 and 6, inner swivel ball bearings 4, are located in a race bounded by taper section of swivel bearing race cone 22 which is a segment of swivel bearing race bushing cone, and outer retainer wall surface for swivel bearings 15", and with this arrangement it is readily seen swivel ball bearings 4 carry no load, but function merely to swivel the outer face plate 5 with caster wheel legs 9 attached thereto and caster wheel 10 mounted on the legs.

To indicate some idea of dimension, the load carrying ball bearings could be 0.5" in diameter and the swivel bearings 0.25".

Having described my invention, I claim:

1. Caster wheel mount apparatus comprising:

(a) a top mount plate, and
(b) an outer ball bearing retainer for load carrying bearings attached to said mount plate,
(c) a bearing face plate and
(d) said bearing face plate fitting within the outer load carrying ball bearing retainer and
(e) load carrying ball bearings mounted in a bearing race between said top mount plate and said bearing face plate and
(f) said load carrying ball bearings held in said bearing race by an inner periphery of the outer bearing retainer attached to said mount plate and an outer periphery of an inner load carrying ball bearing retainer ring attached to said bearing face plate and
(g) swivel ball bearings mounted in an inner bearing race between an inner periphery of the inner load carrying ball bearing retainer and a swivel bearing cone and
(h) said swivel bearing cone mounted concentrically around a center post and said center post attached to the center of said top mount plate and
(i) said swivel bearing cone and said bearing face plate held in mounted position by means of a retainer plate mounted on said center post and extending over said swivel bearing cone and held in said mounted position by means of a threaded bolt threaded into said center post and
(j) caster wheel mount legs for mounting of a caster wheel are attached to the outer surface of said face plate and
(k) said caster wheel mount legs are canted at an angle such that the axle of said caster wheel is offset from center line of said center post and
(l) said caster wheel is mounted on said axle held between said legs.

2. Caster wheel mount apparatus of claim 1, wherein:
(a) swivel ball bearings ride in the inner bearing race between the angle surface of swivel bearing cone and
(b) the inner periphery of load carrying ball bearing inner retainer and
(c) a caster wheel mounted on a caster wheel axle,
(d) said axle held in the caster wheel leg mounts by means of a bolt and a nut.

3. Caster wheel mount apparatus of claim 1 wherein:
said caster wheel leg mounts holding said axle are canted at an angle such that the axle is offset from the center line of center post mounted on said top mount plate.

4. Caster wheel mount apparatus of claim 1, wherein:
(a) the swivel bearings ride on the inner race bounded by a
(b) conical section of swivel bearing cone and
(c) the bearing retainer ring.

5. Caster wheel mount apparatus comprising:
(a) a top mount plate
(b) outer ball bearing retainer attached to said mount plate for load carrying ball bearings and
(c) a face plate and
(d) said face plate fitting within an outer load carrying ball bearing retainer and
(e) load carrying ball bearings mounted in an outer bearing race between said top mount plate and said face plate and
(f) said load carrying ball bearings held in said outer bearing race by an inner periphery of the outer bearing retainer attached to said mount plate and an outer periphery of an inner load carrying ball bearing retainer ring attached to said face plate and
(g) swivel ball bearings mounted in an inner bearing race between the inner periphery of the load carrying ball bearing retainer and a stepped center post and
(h) said stepped center post is attached to center of said top mount plate and
(i) said swivel ball bearings are held in said inner bearing race
(j) by means of a swivel bearing retainer and
(k) said swivel bearing retainer is mounted concentrically around a small diameter segment of said stepped center post and
(l) said swivel bearing retainer is held in said mounted position by means of a retainer plate held in position by a threaded bolt and
(m) threaded into female threads of said stepped center post and
(n) said swivel bearing retainer riding on the step of said stepped center post and
(o) legs for mounting of a caster wheel are attached to the outer surface of said face plate and
(p) said caster wheel mount legs are canted at an angle such that a wheel axle mounted between said legs is offset from the center line of said stepped center post and
(q) the caster wheel is mounted on said axle held between said legs.

6. A caster wheel mount apparatus comprising a top mount plate and an outer bearing retainer for load carrying bearings attached to said mount plate, a bearing face plate and said bearing face plate fitting within the outer load carring ball bearing retainer and load carrying ball bearings mounted in a bearing race between said top mount plate and said bearing face plate and said load carrying ball bearings held in said outer bearing race by an inner periphery of the outer bearing retainer atached to said mount plate and an outer periphery of an inner load carrying ball bearing retainer ring attached to said bearing face plate wherein the improvement comprises:
swivel ball bearings mounted in an inner bearing race between the inner periphery of the load carrying ball bearing retainer and a swivel bearing cone and
said swivel bearing cone mounted concentrically around a center post and said center post attached to center of said top mount plate and said swivel bearing cone and said bearing face plate held in mounted position by means of retainer plate mounted on the center post and extending over the swivel bearing cone and held in said mounted position by means of a threaded bolt threaded into said center post and a clearance between the top of said swivel bearing cone and retainer plate and
caster wheel mount legs for mounting of a caster wheel are attached to an outer surface of said face plate and
said caster wheel mount legs are canted at an angle such that an axle is offset from the center line of said center post and the caster wheel being mounted on the axle held between said legs.

* * * * *